US010677207B2

(12) United States Patent
Ashton et al.

(10) Patent No.: US 10,677,207 B2
(45) Date of Patent: Jun. 9, 2020

(54) AXIAL PISTON PUMP HAVING A PISTON HOUSING HAVING FIXED FIELD MEMBERS MOUNTED THERETO AND INTERACTING WITH A STATOR SURROUNDING THE HOUSING AND CONFIGURED TO GENERATE A FORCE WHICH URGES THE HOUSING IN AN AXIAL DIRECTION

(71) Applicant: ROLLS-ROYCE plc, London (GB)

(72) Inventors: Luke Ashton, Birmingham (GB);
Martin Yates, East Haddon (GB);
David Brookes, Birmingham (GB)

(73) Assignee: ROLLS-ROYCE plc, London (GB)

( * ) Notice: Subject to any disclaimer, the term of this patent is extended or adjusted under 35 U.S.C. 154(b) by 482 days.

(21) Appl. No.: 15/468,526

(22) Filed: Mar. 24, 2017

(65) Prior Publication Data
US 2017/0328323 A1    Nov. 16, 2017

(30) Foreign Application Priority Data

May 13, 2016  (GB) .................................. 1608449.3

(51) Int. Cl.
*F02M 59/10*      (2006.01)
*F04B 1/2007*     (2020.01)
(Continued)

(52) U.S. Cl.
CPC ............. *F02M 59/102* (2013.01); *F02C 7/22* (2013.01); *F04B 1/20* (2013.01); *F04B 1/2007* (2013.01);
(Continued)

(58) Field of Classification Search
CPC ........ F04B 1/128; F04B 53/14; F04B 1/2078; F04B 1/20; F04B 23/106; F04B 49/12;
(Continued)

(56) References Cited

U.S. PATENT DOCUMENTS

| RE23,993 E * | 5/1955 | Henrichsen ............. F04B 1/124 |
| | | 91/488 |
| 2,757,612 A * | 8/1956 | Shaw ........................ F04B 1/20 |
| | | 417/268 |

(Continued)

FOREIGN PATENT DOCUMENTS

| CN | 2937546 Y | 8/2007 |
| CN | 201225247 Y | 4/2009 |

(Continued)

*Primary Examiner* — Devon C Kramer
*Assistant Examiner* — Benjamin Doyle
(74) *Attorney, Agent, or Firm* — Oliff PLC

(57) ABSTRACT

An axial piston pump has a fluid inlet, a fluid outlet, and a rotatable, one-piece piston housing carrying one or more pistons movable within one or more respective sleeves formed by the housing. A circumferential row of fixed field members is mounted to the housing at a mounting location formed by the housing, the mounting location being radially outward of the sleeve(s). The pump further has a stator surrounding the piston housing and including a circumferential row of armature windings such that the piston housing and the stator form an electro-magnetic motor operable to rotate the piston housing, and a swashplate engaged with the piston(s) such that rotation of the piston housing relative to the swashplate around an axis of rotation produces reciprocating movement of the piston(s) for the pressurisation of fluid received into the sleeve(s) from the fluid inlet and then discharged from the sleeve(s) to the fluid outlet.

15 Claims, 9 Drawing Sheets

(51) Int. Cl.
*F04B 1/20* (2020.01)
*F02C 7/22* (2006.01)
*F04B 1/2078* (2020.01)
*F04B 15/00* (2006.01)
*F04B 17/03* (2006.01)
*F04B 53/14* (2006.01)
*F04B 53/16* (2006.01)
*F04B 53/08* (2006.01)

(52) U.S. Cl.
CPC ............ *F04B 1/2078* (2013.01); *F04B 15/00* (2013.01); *F04B 17/03* (2013.01); *F04B 53/14* (2013.01); *F04B 53/162* (2013.01); *F04B 53/08* (2013.01); *F05D 2220/32* (2013.01)

(58) Field of Classification Search
CPC ........ F04B 1/2007; F01P 5/12; H02K 49/106; H02K 49/108; F04D 13/024; F04D 13/06; F04D 25/026; F04D 25/06; F04D 25/0633; F04D 25/0606; F01B 3/007; F01B 3/0079; F01B 5/00
USPC .... 417/271, 321, 269, 353, 355, 42; 91/472, 91/481; 310/12.01, 23, 25
See application file for complete search history.

(56) References Cited

U.S. PATENT DOCUMENTS

| | | | |
|---|---|---|---|
| 3,133,504 A | 5/1964 | Haynes | |
| 3,263,623 A * | 8/1966 | Alexanderson | F04B 1/124 92/57 |
| 3,295,457 A * | 1/1967 | Oram | F04B 1/128 417/222.1 |
| 3,596,568 A * | 8/1971 | Wittren | F01B 3/0032 91/472 |
| 3,648,090 A * | 3/1972 | Voin | H02K 3/00 310/191 |
| 3,672,793 A * | 6/1972 | Yowell | F04B 1/128 417/368 |
| 3,688,137 A * | 8/1972 | Filhol | H01B 3/002 310/43 |
| 3,708,130 A * | 1/1973 | Perry | D21D 1/22 241/260 |
| 3,752,053 A * | 8/1973 | Wouters | F01B 3/0055 91/485 |
| 3,999,465 A | 12/1976 | Burnight | |
| 4,019,425 A * | 4/1977 | Matzelle | F04B 1/2042 91/487 |
| 4,045,696 A | 8/1977 | Lutz | H02K 37/02 310/49.43 |
| 4,500,261 A * | 2/1985 | Ode | F04B 1/20 417/203 |
| 4,622,885 A * | 11/1986 | Schriwer | F04B 1/20 91/487 |
| 4,850,812 A * | 7/1989 | Voight | F04B 1/20 417/271 |
| 4,920,295 A * | 4/1990 | Holden | H02K 21/027 310/191 |
| 4,922,119 A * | 5/1990 | Raad | B64D 33/00 290/31 |
| 5,220,225 A * | 6/1993 | Moon, Jr. | F04B 1/22 310/87 |
| 5,320,501 A | 6/1994 | Langosch et al. | |
| 5,486,730 A * | 1/1996 | Ludwig | H02K 1/278 156/293 |
| 5,591,013 A * | 1/1997 | Kawafune | F04B 1/20 417/222.1 |
| 5,708,311 A * | 1/1998 | Claar | F04B 1/20 310/63 |
| 5,927,073 A * | 7/1999 | Ishizaki | F04B 1/22 60/487 |
| RE36,341 E * | 10/1999 | Howell | B04B 5/0414 221/82 |
| 6,048,179 A * | 4/2000 | Forster | B60K 6/26 417/222.1 |
| 6,481,985 B2 * | 11/2002 | Fujii | F04B 27/0895 417/269 |
| 6,500,087 B2 | 12/2002 | Klinger et al. | |
| 6,565,329 B2 * | 5/2003 | Yokomachi | F04B 27/0895 417/269 |
| 6,769,745 B2 * | 8/2004 | Mohr | B60T 8/4022 303/10 |
| 7,182,583 B2 * | 2/2007 | Gandrud | F04B 1/14 310/62 |
| 8,358,042 B2 * | 1/2013 | Yamada | F03C 1/0607 310/112 |
| 8,487,500 B2 | 7/2013 | Cullen et al. | |
| 9,000,602 B2 * | 4/2015 | Yamada | F03C 1/0623 290/1 R |
| 9,041,264 B2 | 5/2015 | Langford et al. | |
| 2003/0077183 A1 * | 4/2003 | Franchet | F15B 7/006 417/269 |
| 2004/0136847 A1 | 7/2004 | Arbogast et al. | |
| 2004/0166002 A1 | 8/2004 | Lanfredi | |
| 2006/0140787 A1 | 6/2006 | Amrhein et al. | |
| 2007/0046266 A1 * | 3/2007 | Ganev | H02P 9/48 322/28 |
| 2007/0053780 A1 * | 3/2007 | Ruffner | F04B 1/128 417/410.1 |
| 2008/0197724 A1 | 8/2008 | Cullen et al. | |
| 2009/0001831 A1 | 1/2009 | Cho et al. | |
| 2009/0263258 A1 * | 10/2009 | Gandrud | F04B 1/128 417/251 |
| 2010/0143170 A1 * | 6/2010 | Peia | F04D 25/08 417/423.7 |
| 2015/0192075 A1 | 7/2015 | Griffiths | |
| 2015/0380999 A1 * | 12/2015 | Joshi | H02K 1/28 310/156.28 |
| 2017/0016432 A1 * | 1/2017 | Ishikawa | F04B 1/22 |
| 2017/0268806 A1 * | 9/2017 | Knopp | H02K 1/20 |
| 2018/0179872 A1 * | 6/2018 | Filatov | E21B 43/16 |
| 2018/0316243 A1 * | 11/2018 | Gundlach | H02K 7/09 |

FOREIGN PATENT DOCUMENTS

| | | |
|---|---|---|
| CN | 103441611 A | 12/2013 |
| CN | 203420844 U | 2/2014 |
| CN | 203423578 U | 2/2014 |
| DE | 19815614 A1 | 9/1999 |
| DE | 10331191 A1 | 1/2005 |
| EP | 2607696 A1 | 6/2013 |
| GB | 551061 A | 2/1943 |
| WO | 2009/146060 A2 | 12/2009 |

* cited by examiner

AXIAL PISTON PUMP HAVING A PISTON HOUSING HAVING FIXED FIELD MEMBERS MOUNTED THERETO AND INTERACTING WITH A STATOR SURROUNDING THE HOUSING AND CONFIGURED TO GENERATE A FORCE WHICH URGES THE HOUSING IN AN AXIAL DIRECTION

FIELD OF THE INVENTION

The present invention relates to an axial piston pump. Particularly the present invention relates to an axial piston pump utilizing an electro-magnetic motor.

BACKGROUND

Axial piston pumps can be used in aeroengine fuel control systems, e.g. to provide pressurised fuel to actuate auxiliary engine devices such as variable vanes and bleed valves, and to provide additional fuel supply to the combustor at high burnt flow engine operating conditions. An example of an axial piston pump in such a control system is described in US 2015/0192075.

An axial piston pump is a positive displacement pump containing at least one piston within a piston housing. It operates by rotation of the piston relative to a swashplate, which is typically a flat disc angled relative to the piston and the axis of rotation. The swashplate functions as a cam to transform rotational movement into reciprocal movement of the pistons. Conventionally, the rotational movement is provided via an auxiliary shaft connected to the drive shaft of an engine. It is also known to provide an electric-motor to drive a piston pump. However such electric-motor driven axial piston pumps are generally heavy, axially long, and sub-optimal from a perspective of integration with a fuel supply system.

SUMMARY

In general terms, the invention provides an axial piston pump, driven by an electro-magnetic motor, wherein the piston housing is fitted with fixed-field members such that it is also the rotor assembly of the electro-magnetic motor.

Accordingly, in a first aspect, the present invention provides an axial piston pump having:
- a fluid inlet, and a fluid outlet;
- a rotatable, one-piece piston housing carrying one or more pistons movable within one or more respective sleeves formed by the housing, a circumferential row of fixed field members being mounted to the housing at a mounting location formed by the housing, the mounting location being radially outward of the sleeve(s);
- a stator surrounding the piston housing and including a circumferential row of armature windings such that the piston housing and the stator form an electro-magnetic motor operable to rotate the piston housing; and
- a swashplate engaged with the piston(s) such that rotation of the piston housing relative to the swash plate around an axis of rotation (A) produces reciprocating movement of the piston(s) for the pressurisation of fluid received into the sleeve(s) from the fluid inlet and then discharged from the sleeve(s) to the fluid outlet.

Advantageously, integration of the fixed-field members with the one-piece (i.e. unitary or single component) piston housing can substantially reduce the weight, axial length, and complexity of the axial piston pump, and facilitates scalability of the pump to meet different fluid pressurisation and flow rate requirements. In particular, the pump may be formed such that it does not have any non-rotating components interposed between the fixed field members and the sleeve(s). Additionally, the integration is consistent with the provision of "wet" internal electro-magnetic elements, i.e. allowing at least some parts of the fixed field members and/or the armature windings to be exposed to the pumped fluid, thereby avoiding a need for a rotational drive-shaft seal. For example, the pumped fluid can be allowed to penetrate into the air gap which is formed between the fixed field members and the armature windings. Furthermore, the pump, being electrically driven, can avoid an input mechanical drive shaft and hence can avoid leakage around such a shaft. Also, the pump can avoid a need for an adjustable swashplate to vary the pump pressure, as the speed at which the piston housing rotates may be controlled instead by the electro-magnetic motor to vary the pump pressure.

In a second aspect, the invention provides an engine fuel control system having an axial piston pump of the first aspect, the axial piston pump being arranged to deliver fuel to one or more fuel-pressure operated auxiliary engine devices.

In a third aspect, the invention provides a gas turbine engine (e.g. an aeroengine) having one or more fuel-pressure operated auxiliary engine devices (e.g. variables vanes and/or bleed valves), and the engine fuel control system of the second aspect.

Optional features of the invention will now be set out. These are applicable singly or in any combination with any aspect of the invention.

The fixed-field members and the armature windings may be configured such that, when an electrical current is passed through the armature windings, the armature windings generate a magnetic field which interacts with a magnetic field generated by the fixed-field members, the interaction providing a force which urges the piston housing in an axial direction. Advantageously, this interaction force can be selected to counteract a hydrodynamic force produced at the sliding interface between the piston housing and static parts of the pump when the pump is in use. In particular, left unchecked, the hydrodynamic force can cause axial movement of the piston housing, thereby producing fluid leakage from the high pressure (outlet) side to the low pressure (inlet) side of the pump. Thus the magnetic field interaction force may promote better sealing.

For example, a radially inner and/or outer face of each fixed field member may be angled relative to the axis of rotation of the piston housing so as to generate a magnetic field which interacts with a magnetic field generated by the armature windings when an electrical current is passed through the armature windings, to provide a force which urges the piston housing in the axial direction.

Additionally or alternatively, a radially outer surface of the piston housing and a facing radially inner surface of the stator may each be frustoconical in shape, and the fixed field members and armature windings may be disposed around the respective frustoconical surfaces, such that, when a current is passed through the armature windings, the armature windings generate a magnetic field which interact with the magnetic field generated by the fixed-field members, these magnetic fields interacting to urge the piston housing in the axial direction. In such an example, the radial thickness of the stator may vary along the axial direction, such that a radially outer surface of the stator is cylindrical. Another option, however, is that the radial thickness of the stator remains constant along the axial direction, such that the outer surface of the stator is frustoconical and parallel to the radially inner surface.

The piston(s) may be angled relative to the axis of rotation. This can allow the axial length of the piston pump to be further reduced. For example, the angle between the piston(s) and the axis of rotation may be such that the piston(s) are radially closest to the axis of rotation at an end of the housing which is proximate to the swashplate. This can allow the fluid inlet and outlet to be at an increased radial distance from the axis of rotation. Alternatively, the angle between the one or more pistons and the axis of rotation may be such that the one or more pistons are radially closest to the axis of rotation at an end of the housing which is distal from the swashplate. This can increase the volume of the piston housing which is available to mount the fixed field members, particularly when either the radially outer surface of the piston housing is frustoconical in shape or when at least one of the poles of each fixed field member is angled relative to the axis of rotation.

The piston pump may have a retention sleeve, e.g. an Inconel sleeve, between the stator and the piston housing to retain the fixed field members to the piston housing. Advantageously, this can also increase the lifetime of the piston pump by reducing wear of the fixed field members.

The piston housing may carry a circumferential row of pistons movable within a circumferential row of respective sleeves formed by the housing. For example, there may be eight pistons carried by the piston housing, and the eight pistons may be uniformly angularly distributed around the piston housing.

The fixed-field members may be permanent magnets. Another option is for the magnets to be conductive rods. Yet another option is for the fixed field members to be direct current field windings. Typically, direct current field windings are wound around respective iron cores.

The axial piston pump may have four pairs of fixed-field members, the members of each pair being respectively disposed on opposing sides of the piston housing, thereby forming an 8-pole rotor, and the pump may have a stator which is a 10-pole stator, thereby forming a 5-phase electromagnetic motor.

The swashplate may be a fixed (i.e. non-adjustable) swashplate.

The axial piston pump may have a cooling fluid path between the fluid outlet and the fluid inlet which passes through the stator, the cooling fluid flowing from the fluid outlet to the fluid inlet. For example, a portion of the pumped fluid discharged from the sleeve(s) to the fluid outlet can be recirculated as a cooling flow via the cooling path to the fluid inlet. Therefore the cooling fluid can be driven by the pumping force generated by the axial piston pump itself, avoiding a need for a separate motor or pump. The cooling fluid path may be tortuous through the stator. That is to say, the cooling-path may take a longer route than is necessary between the fluid outlet and the fluid inlet. As will be understood, for a cooling fluid to operate efficiently, the cooling fluid should come into as much contact with the elements to be cooled as possible.

The axial piston pump may also have a support shaft for the piston housing, the shaft also being rotatable relative to the swash plate about the axis of rotation. Conveniently, the piston housing may have a central bore through which the support shaft extends to axially align the piston housing with the stator.

The stator and fixed-field members may be configured to form an axial-flux motor topology. That is, the poles of the fixed-field members and the stator may be generally aligned parallel or antiparallel with the axis of rotation, and therefore the flux generated by the fixed-field members and the armature windings in the space therebetween is substantially parallel with the axis of rotation of the piston housing. Advantageously, this may further help to reduce the radial dimension of the piston pump.

BRIEF DESCRIPTION OF THE DRAWINGS

The invention will now be described by way of example with reference to the accompanying drawings in which.

DETAILED DESCRIPTION AND FURTHER OPTIONAL FEATURES

Figure 1:
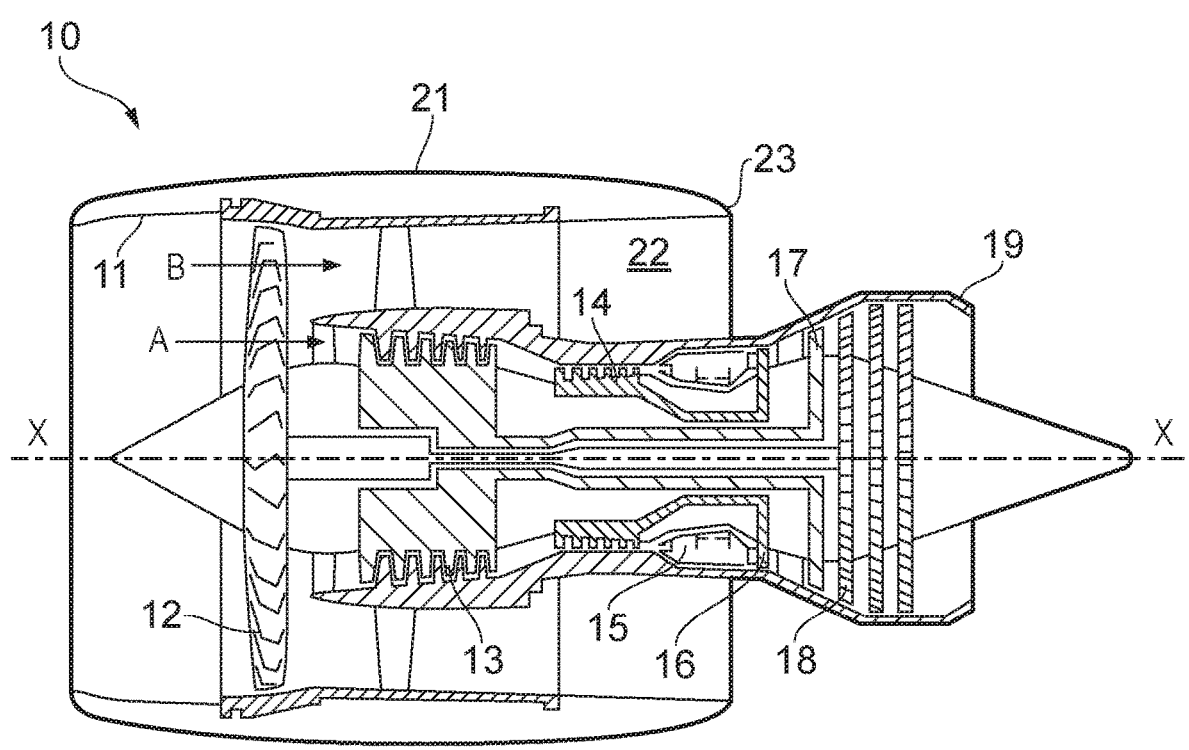
FIG. 1 shows a longitudinal cross-section through a ducted fan gas turbine engine.

With reference to FIG. 1, a ducted fan gas turbine engine incorporating the invention is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
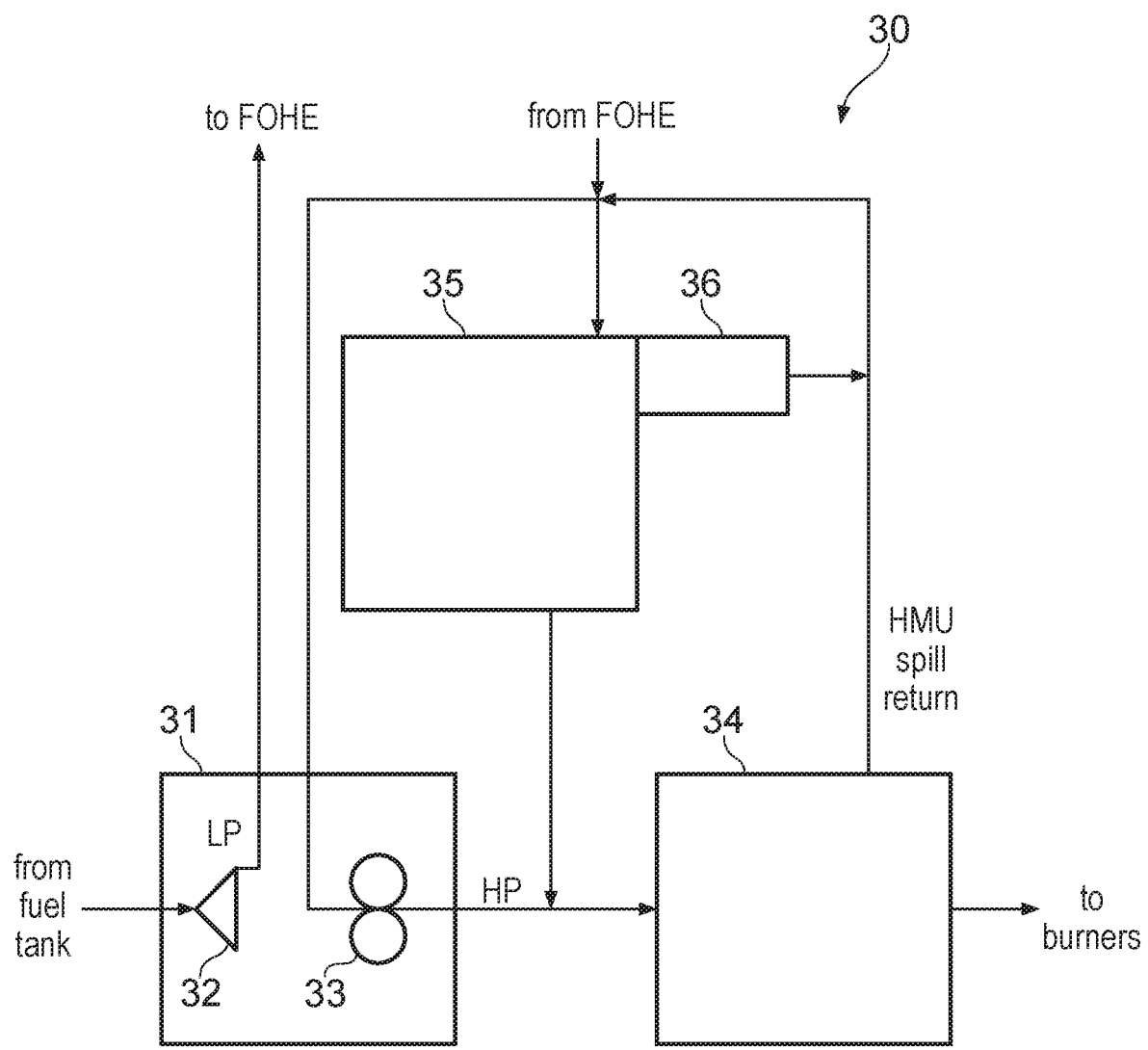
FIG. 2 shows schematically a fuel control system of the engine of FIG. 1.

A fuel control system 30 of the engine, shown schematically in FIG. 2, has a main pump unit 31 comprising a low pressure (LP) pump 32 which draws fuel from a fuel tank of the aircraft and supplies the fuel at boosted pressure LP to the inlet of a high pressure (HP) fixed displacement pump 33. The inter-stage flow between the LP and HP pumping stages is typically used to cool engine lubrication oil in a fuel/oil heat exchanger (FOHE)

The HP pump 33 feeds HP fuel to a hydro-mechanical unit (HMU) 34 of the fuel control system, the hydro-mechanical unit controlling the rate at which fuel is allowed to flow to burners of the engine. Not all the HP fuel exiting the HP pump 33 may be burnt in the engine. A substantial proportion may be recirculated back to the pump unit 31 via a spill return of the HMU.

The fuel control system also has an actuator pump unit 35 which receives a portion of the LP fuel from the FOHE mixed with fuel from the HMU spill return.

The actuator pump unit 35 contains an axial piston pump which pressurises the LP fuel to a high pressure. The pressurised fuel is then delivered to fuel-pressure operated auxiliary engine devices 36, such as actuator servo-valves for variable stator vanes, variable inlet guide vanes and bleed valves. Thereafter the pressurised fuel is sent to the HMU spill return. The actuator pump unit also allows the axial piston pump to combine with the HP pump to deliver fuel to the HMU 34, and thence the burners.

Figure 3:
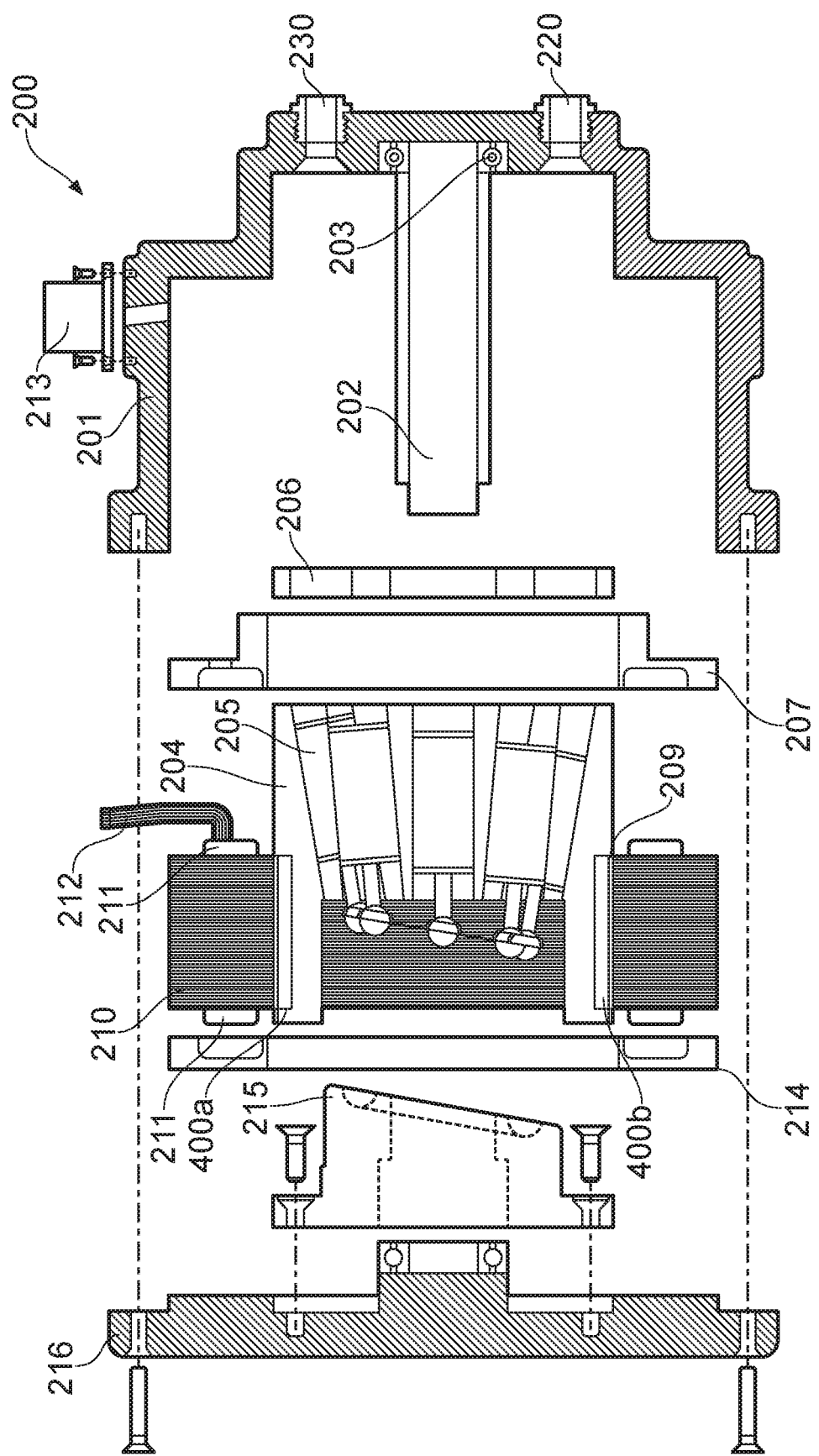
FIG. 3 shows a partially-exploded cross-section through an axial piston pump of the fuel control system of FIG. 2.
Figure 4:
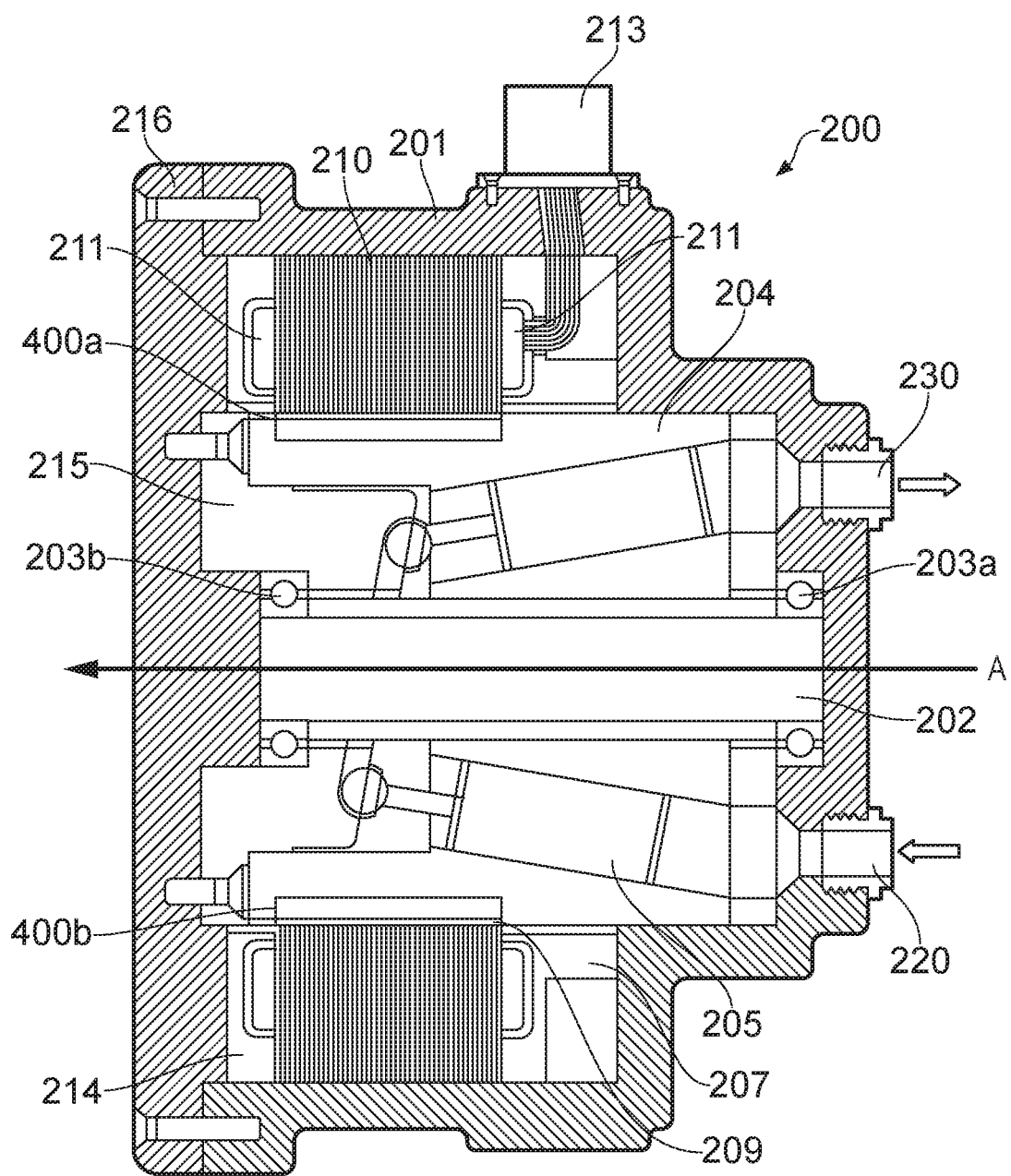
FIG. 4 shows a non-exploded cross-section through the axial piston pump.

With reference to the partially-exploded cross-section of FIG. 3 and the non-exploded cross-section of FIG. 4, the axial piston pump of the fuel control system 30 is generally indicated by 200. The axial piston pump 200 comprises a main chassis 201 and a back chassis plate 216 made of a suitable material such that the pump is structurally sound as well as not prone to leaking. The main chassis 201 contains a fluid inlet port 220 for receiving a flow of low pressure fluid, and a fluid outlet port 230 for issuing a flow of high pressure fluid pressurised by the pump. A support shaft 202 may be provided centrally, which extends along a main axis of rotation A of the pump 200 and is connected to the main chassis 201 via a front bearing support assembly 203a and to the back chassis plate 216 by a rear bearing support assembly 203b. Positioned around the support shaft 202, and connected thereto such that they rotate together, is a one-piece piston housing 204 which also functions as a rotor assembly. The piston housing 204 forms a number of piston sleeves within which are pistons 205. The pistons 205 move backwards and forwards within their respective piston sleeves, thereby drawing in and expelling fluid being pumped. A fixed (non-rotating) valve plate 206 is positioned adjacent to the front end of piston housing 204, with a fluid inlet aperture and a diametrically opposite fluid outlet aperture. The inlet aperture fluidly connects to the or each sleeve when that sleeve is rotated by the piston housing to a position to receive low pressure fluid from the inlet port 230, and the outlet aperture fluidly connects the outlet port 230 to the or each sleeve when that sleeve is rotated by the piston housing to a position to discharge high pressure fluid.

Embedded within the piston housing 204 at a mounting location radially outward of the pistons 205 is a circumferential row of fixed field members in the form of magnets 400a and 400b. These magnets allow the piston housing 204 to function as a rotor assembly of an electro-magnetic motor. Whilst the magnets 400a and 400b in this example are permanent magnets, it is understood that direct current field windings or conducting rods fixed field members may be used instead, so long as the end result is a piston housing 204 which may also operate as an electro-magnetic motor rotor assembly.

On an outer surface of the piston housing 204 is an Inconel sleeve 209 which helps to retain the magnets 400a 400b to the piston housing 204, as well as to protect them from corrosion and to electrically isolate them from a wiring stack of a stator 210 which encircles the piston housing 204. The stack is formed of turns of conductive wiring, i.e. armature windings, wound around laminated teeth such that a magnetic field is generated when current is passed through the windings. Stator end windings 211 protrude from both ends of the stator 210 which allows connection of the stator 210 to a winding lead out 212. The winding lead out 212 is connected to a channel connector 213 which is embedded in the main chassis 201. This channel connector 213 allows the speed of the electro-magnetic motor formed by the stator 210 and piston housing 204 to be electronically controlled.

A front end insulator 207 is provided to electrically isolate the front end of the stator and the winding lead out 212 from the pumped fluid, and a rear end insulator 214 performs a similar role at the rear end of the stator. Passing through a central aperture of the rear end insulator 214 is a fixed swashplate 215, which is fixed to the back chassis plate 216 so that it is not movable relative to the piston housing. The pistons 205 engage the swashplate 215, and as the piston housing 204 (and therefore the pistons 205) rotate relative to the swashplate, the rotational movement is translated into reciprocal movement of the pistons 205 in their sleeves.

The integration of the piston housing 204 and rotor assembly (by embedding magnets 400a, 400b into the housing 204) results in a robust, scalable axial piston pump with a short axial length. It is also consistent with avoiding a rotational drive-shaft seal and with allowing the pumped fuel to penetrate into the air gap between the rotor assembly and the stator 210. As the pump has a fixed swashplate 215, control of the fluid pressurisation by the pump is performed by controlling the speed of the electro-magnetic motor.

Figure 5:
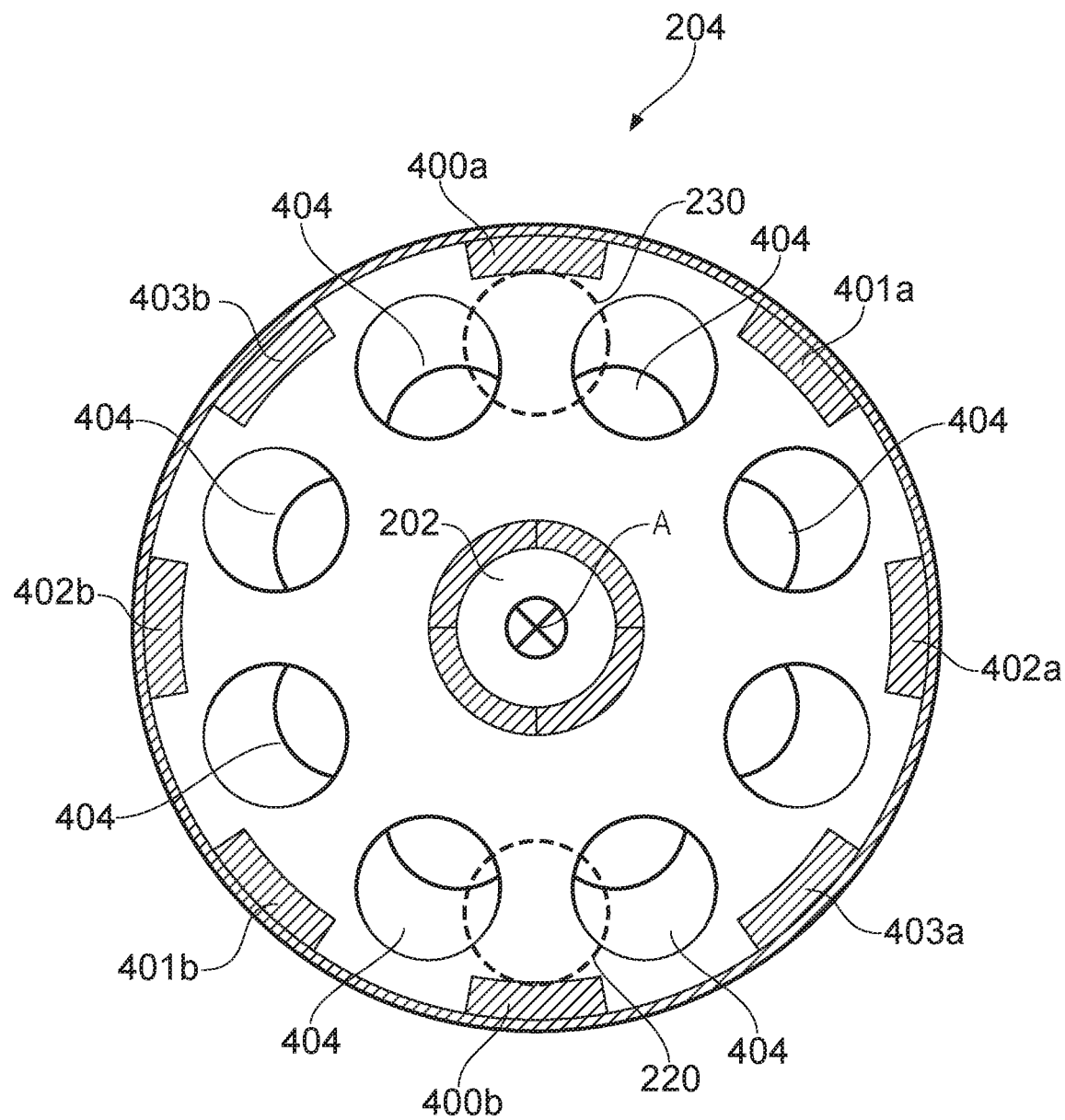
FIG. 5 shows a front-end view of the piston housing used in the axial piston pump.

Turning now to FIG. 5, this illustrates a front-end view of the piston housing 204 of the axial piston pump 200 discussed above. In this example, the housing 204 has eight sleeves 404 each for containing a respective piston (not shown). Further, there are eight magnets formed in four pairs: 400a, 400b; 401a, 401b; 402a, 402b; and 403a, 403b. These magnets are uniformly angularly distributed around the housing 204 at respective mounting locations. The piston sleeves 404 are also uniformly angularly distributed around the housing. In this example, the piston sleeves 404 are angled with respect to the axis of rotation A such that they are radially furthest from the axis of rotation A at the front end of the housing 204 which contacts the valve plate 206.

The dotted lines 220 and 230 indicate the position of the fluid inlet port and outlet port relative to the piston housing. As the piston housing 204 rotates, each of the piston sleeves 404 aligns in turn with the fluid inlet port and, later, with the fluid outlet port. The swashplate 215 is arranged such that a piston 205 within its respective sleeve 204 is moving away from the fluid inlet port as the piston sleeve 404 aligns with the inlet aperture of the valve plate 206. This draws fluid into the sleeve 404 from the fluid inlet port. Similarly, the swashplate 215 is arranged such that a piston 205 within its respective sleeve 204 is moving towards the fluid outlet port as the piston sleeve 404 aligns with the outlet aperture of the valve plate 206. This pushes the fluid held within the sleeve 404 out through the fluid outlet port 230.

Figure 6A:
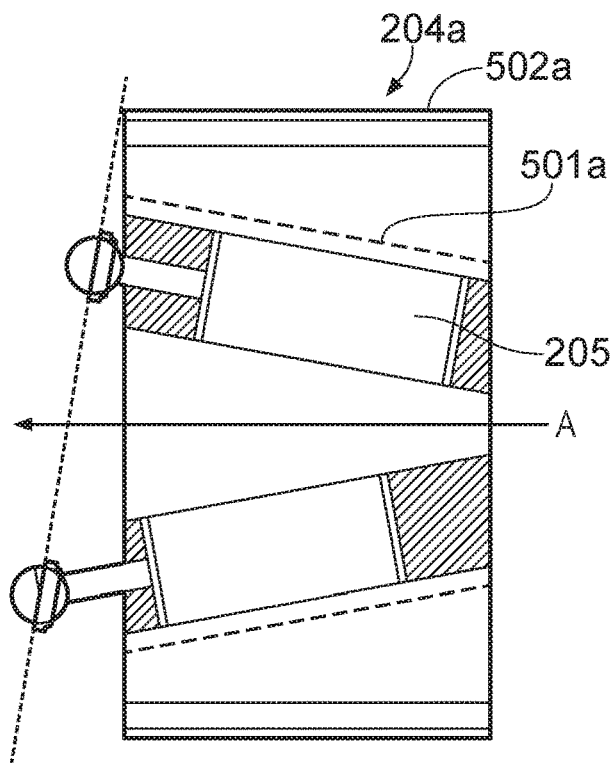
FIG. 6A shows a cross-section of a piston housing with a cylindrical outer surface.
Figure 6B:
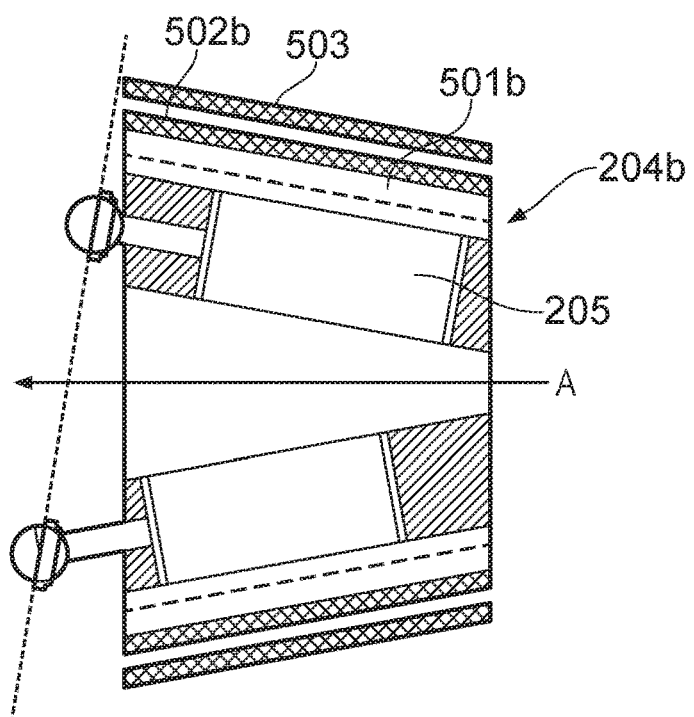
FIG. 6B shows a cross-section of a stator and a piston housing, the housing having a frustoconical outer surface.

FIGS. 6A and 6B illustrate different possible geometries of the piston housing 204 and magnets. In FIG. 6A, the piston housing 204a is generally cylindrical, having a radially exterior surface 502a which is parallel with the axis of rotation A. The embedded magnets are located within region 501a radially outward of the sleeves 205, such that they are operably linked with the stator (not shown) surrounding the piston housing 204. The region 501a forms a trapezoidal shape on the illustrated cross-section, with a longer of the two parallel sides of the shape being at the front end of the housing 204a. This produces an increasing thickness of the magnets towards the front of the housing and allows the magnetic field generated therefrom to interact with the stator's magnetic field to provide a force on the piston housing 204a which has a component parallel to the axis of rotation A. This force component can counter a hydrodynamic force produced at the sliding interface between the front face of the piston housing 204a and the valve plate 206 when the pump is in use. Left uncountered, the hydrodynamic force could cause leakage across the sliding interface from the high to the low pressure side of the pump. Advantageously, the magnitude of the countering force component is typically a function of the speed at which the piston housing 204 is rotated, and thus can be made to increase in proportion to increases in the hydrodynamic force.

In contrast, the radially outer surface 502b of the piston housing 204b and facing radially inner surface of the stator 503 shown in FIG. 6B are frustoconical in shape. The embedded magnets are located within the cross-hatched region immediately below the surface 502b, which on the illustrated cross-section is shaped as an elongate parallelogram. When the stator 503 is operated, this configuration also generates a force on the piston housing 204b which has a component parallel to the axis of rotation A able to counter the aforementioned hydrodynamic force.

In both of these arrangements, the piston sleeves' angle with respect to the axis of rotation A has been altered relative to the arrangement shown in FIGS. 3-5 such that they are radially closest to the shaft 202 at the front end of the housing 204. This can increase the volume of the housing 204 available for mounting the embedded magnets 501a 501b.

Figure 7A:
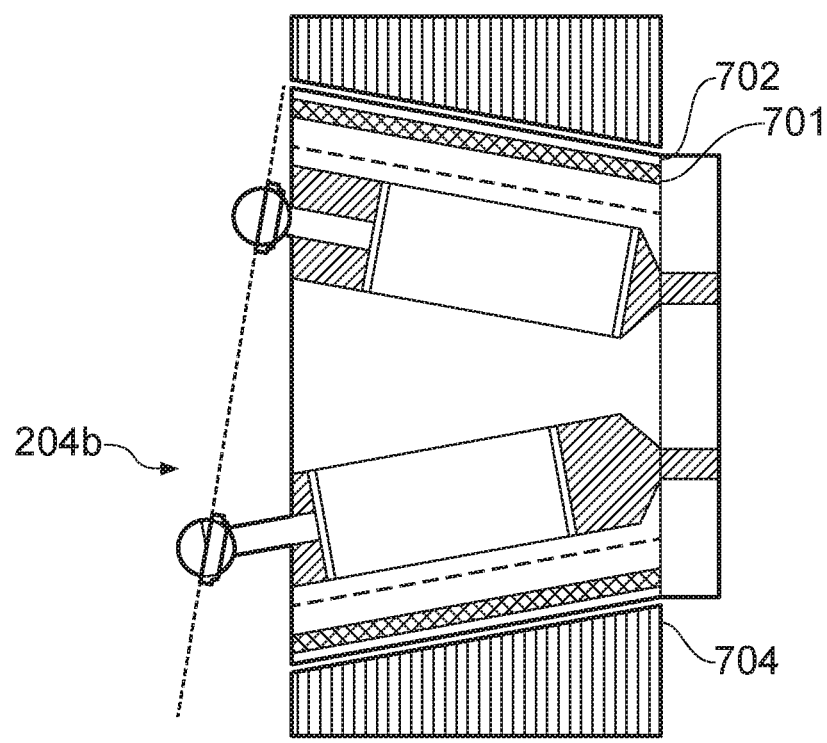
FIG. 7A shows a cross-section of a stator and a piston housing, the housing having a frustoconical outer surface and the stator having a cylindrical outer surface.
Figure 7B:
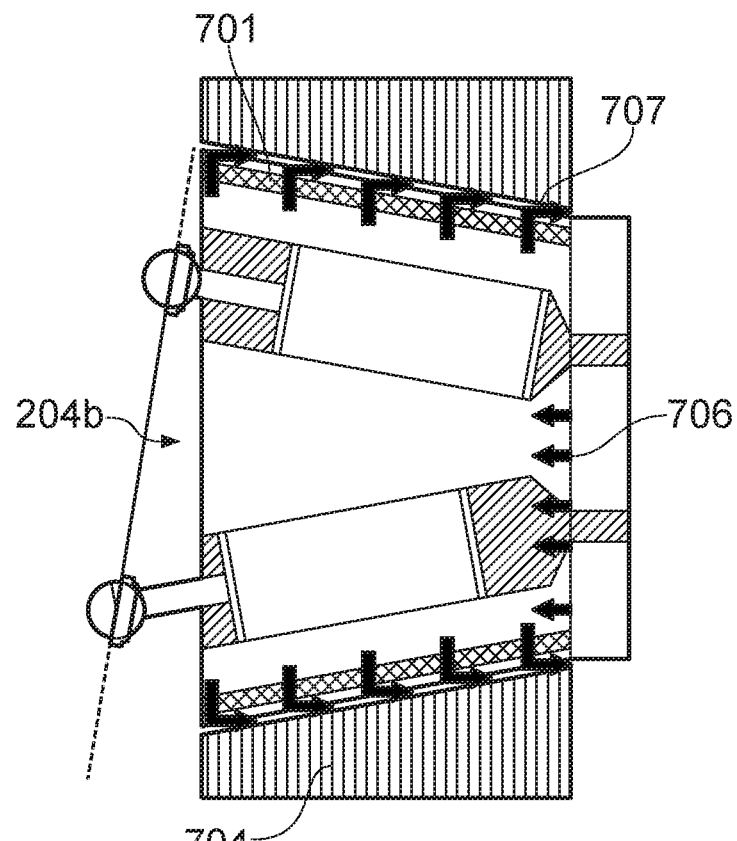
FIG. 7B shows a simplified force diagram for the stator and the piston housing of FIG. 7A.

In FIG. 6B, the radially outer surface of the stator 503 is also frustoconical in shape so that the stator has a constant radial thickness. In contrast, FIG. 7A shows another arrangement utilizing a frustoconical piston housing 204b in which the stator 704 varies in radial thickness along the axis of rotation A such that a radially outer surface of the stator is cylindrical. This configuration of the stator can facilitate its integration with other components of the pump. It also allows the magnetic field generated by the stator 704 to contribute to an increased force component to counter the interfacial hydrodynamic force. These forces are shown schematically on FIG. 7B, the block arrows 706 indicating the hydrodynamic force and the block arrows 707 indicating the magnetic force on the piston housing 204b which has a component opposing the hydrodynamic force. In this arrangement an Inconel sleeve 702 also covers the outer surface of the fixed field members 701.

Figure 8:
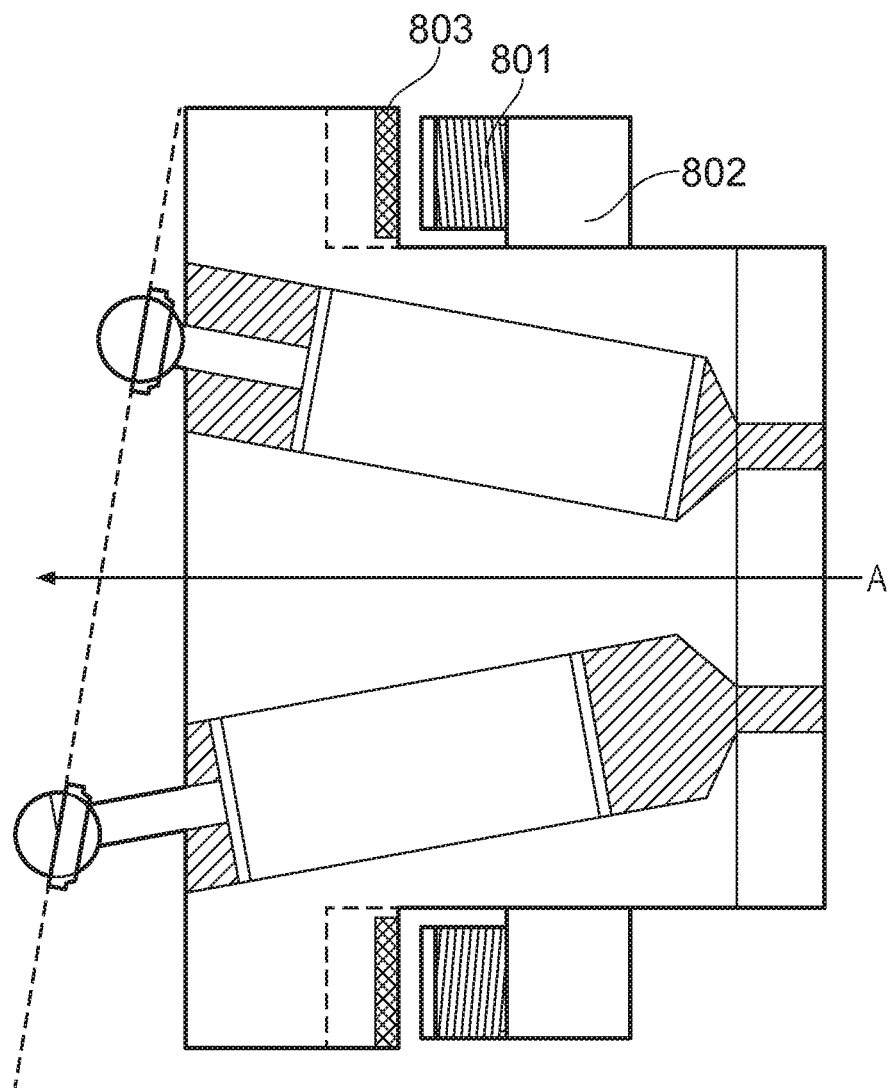
FIG. 8 shows a cross-section of a piston housing and stator arrangement providing an axial-flux electro-magnetic motor.

FIG. 8 shows another possible geometry which may be used in the pump 200. Here the piston housing magnets 803 are positioned such that they provide axial-flux (i.e. the poles of the magnets are parallel or antiparallel with the axis of rotation A). The armature windings 801 of the stator 802 are similarly configured to provide axial-flux, such that the stator/rotor combination operates as an electro-magnetic motor having axial-flux topology.

Figure 9:
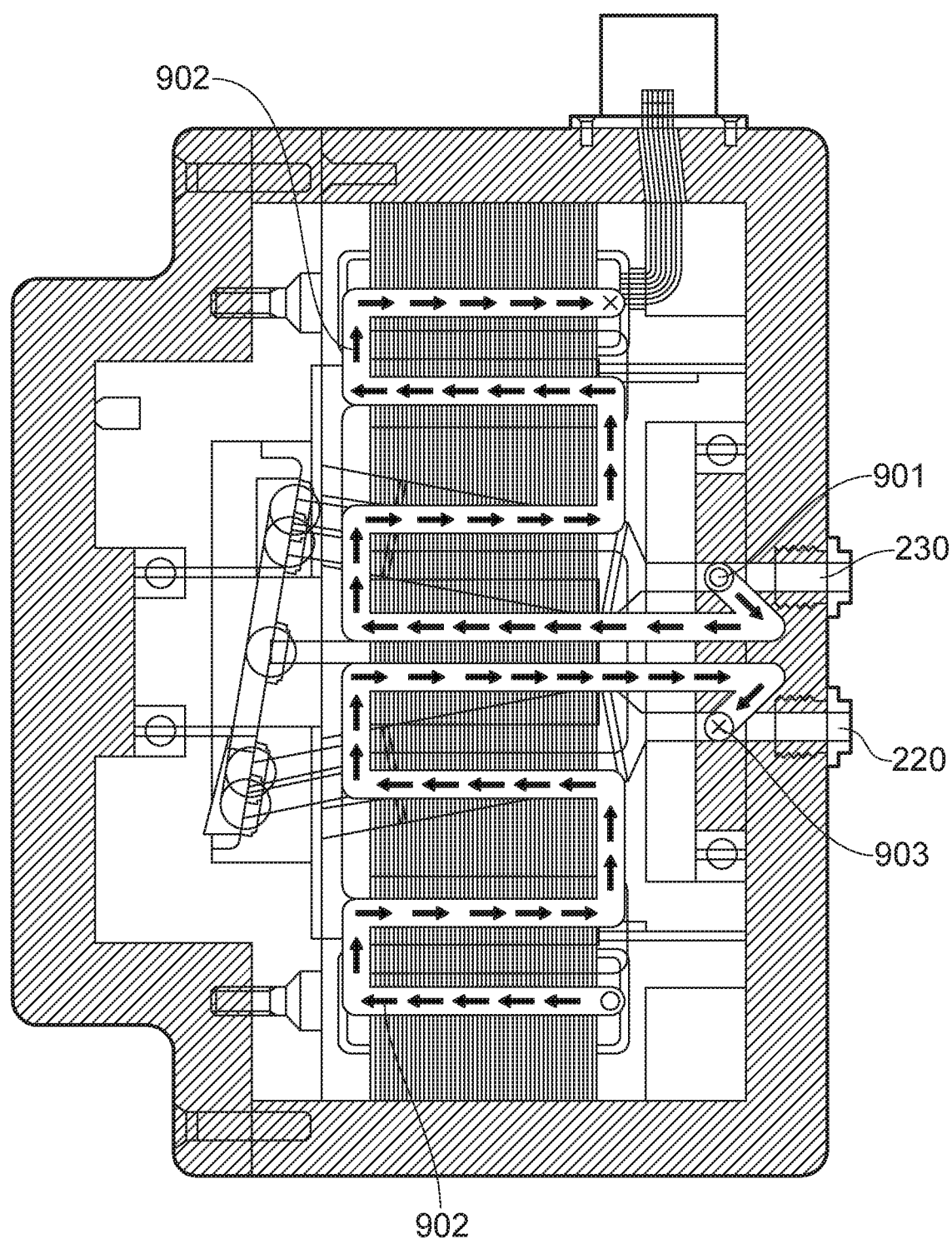
FIG. 9 shows a cross-section of an axial piston pump including a cooling fluid path.

FIG. 9, shows a development of the pump 200 which includes a cooling fluid path 902. The path 902 starts at point 901 which is a branch from the fluid outlet port 230. The cooling-path 902 ends at point 903, where it joins the fluid inlet port 220. The higher pressure on the side of the fluid outlet port 230 diverts a portion of the pumped fluid into the cooling fluid path 902, the diverted fluid then being recirculated at point 903. The cooling fluid path 902 in this example is tortuous in that it snakes between the armature windings of the stator. This improves the cooling efficiency of the fluid.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

What is claimed is:

1. An axial piston pump for pumping a fluid and having:
a fluid inlet, and a fluid outlet;
   a rotatable, one-piece piston housing carrying one or more pistons movable within one or more respective sleeves formed by the housing, a circumferential row of fixed field members being mounted to the housing at a mounting location formed by the housing, the mounting location being radially outward of the sleeve(s);
   a stator surrounding the piston housing and including a circumferential row of armature windings such that the piston housing and the stator form an electro-magnetic motor operable to rotate the piston housing; and
   a swashplate engaged with the piston(s) such that rotation of the piston housing relative to the swash plate around an axis of rotation produces reciprocating movement of the piston(s) for the pressurization of the pumped fluid received into the sleeve(s) from the fluid inlet and then discharged from the sleeve(s) to the fluid outlet;
   wherein the fixed field members and the armature windings are configured such that, when an electrical current is passed through the armature windings, the armature windings generate a magnetic field which interacts with a magnetic field generated by the fixed field members, the interaction providing a force which urges the piston housing in an axial direction, the magnitude of the force being a function of the speed at which the piston housing is rotated.

2. The axial piston pump of claim 1, wherein the pump is configured such that the pumped fluid penetrates into an air gap formed between the fixed field members and the armature windings.

3. The axial piston pump of claim 1, wherein a radially inner and/or outer face of each fixed field member is angled relative to the axis of rotation of the piston housing so as to generate a magnetic field which interacts with a magnetic field generated by the armature windings when an electrical current is passed through the armature windings, to provide the force which urges the piston housing in the axial direction.

4. The axial piston pump of claim 1, wherein a radially outer surface of the piston housing and a facing radially inner surface of the stator are each frustoconical in shape, and the fixed field members and armature windings are disposed around the respective frustoconical surfaces, such that, when a current is passed through the armature windings generate the magnetic field which interacts with the magnetic field generated by the fixed field members, the interaction providing the force which urges the piston housing in the axial direction.

5. The axial piston pump of claim 4 wherein a radial thickness of the stator varies along the axial direction, such that a radially outer surface of the stator is cylindrical.

6. The axial piston pump of claim 4, wherein a radially outer surface of the stator is frustoconical and parallel to the radially inner surface.

7. The axial piston pump of claim 1, wherein the piston(s) are angled relative to the axis of rotation.

8. The axial piston pump of claim 7, wherein the piston(s) are radially closest to the axis of rotation at an end of the housing which is proximate to the swashplate.

9. The axial piston pump of claim 7, wherein the angle of the one or more pistons is such that the one or more pistons are radially closest to the axis of rotation at an end of the housing which is distal from the swashplate.

10. The axial piston pump of claim 1, further having a retention sleeve between the stator and the piston housing to retain the fixed field members to the piston housing.

11. The axial piston pump of claim 1, wherein the piston housing carries a circumferential row of pistons movable within a circumferential row of respective sleeves formed by the housing.

12. The axial piston pump of claim 1, having a cooling fluid path which extends from the fluid outlet to the fluid inlet, and which passes through the stator.

13. The axial piston pump of claim 1, wherein the stator and fixed field members are configured to form an axial-flux electro-magnetic motor topology.

14. An engine fuel control system having an axial piston pump as set out in claim 1, the axial piston pump being arranged to deliver fuel to one or more fuel-pressure operated auxiliary engine devices.

15. A gas turbine engine having one or more fuel-pressure operated auxiliary engine devices, and the engine fuel control system of claim 14.

* * * * *